Feb. 24, 1948.  W. W. FOSTER  2,436,717
AUTOMATIC CATHEAD
Filed March 17, 1944  2 Sheets-Sheet 1
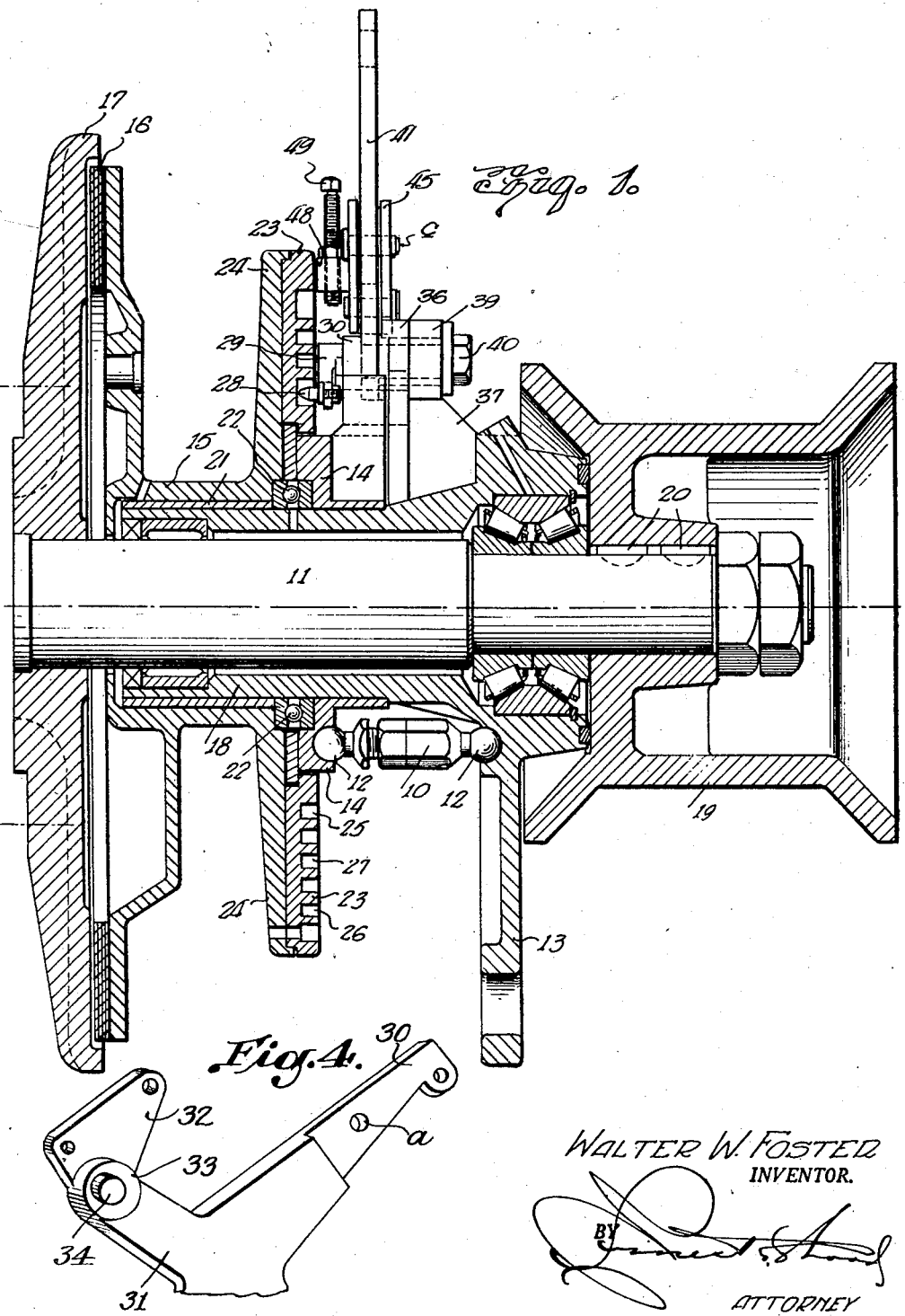
WALTER W. FOSTER
INVENTOR.
BY
ATTORNEY

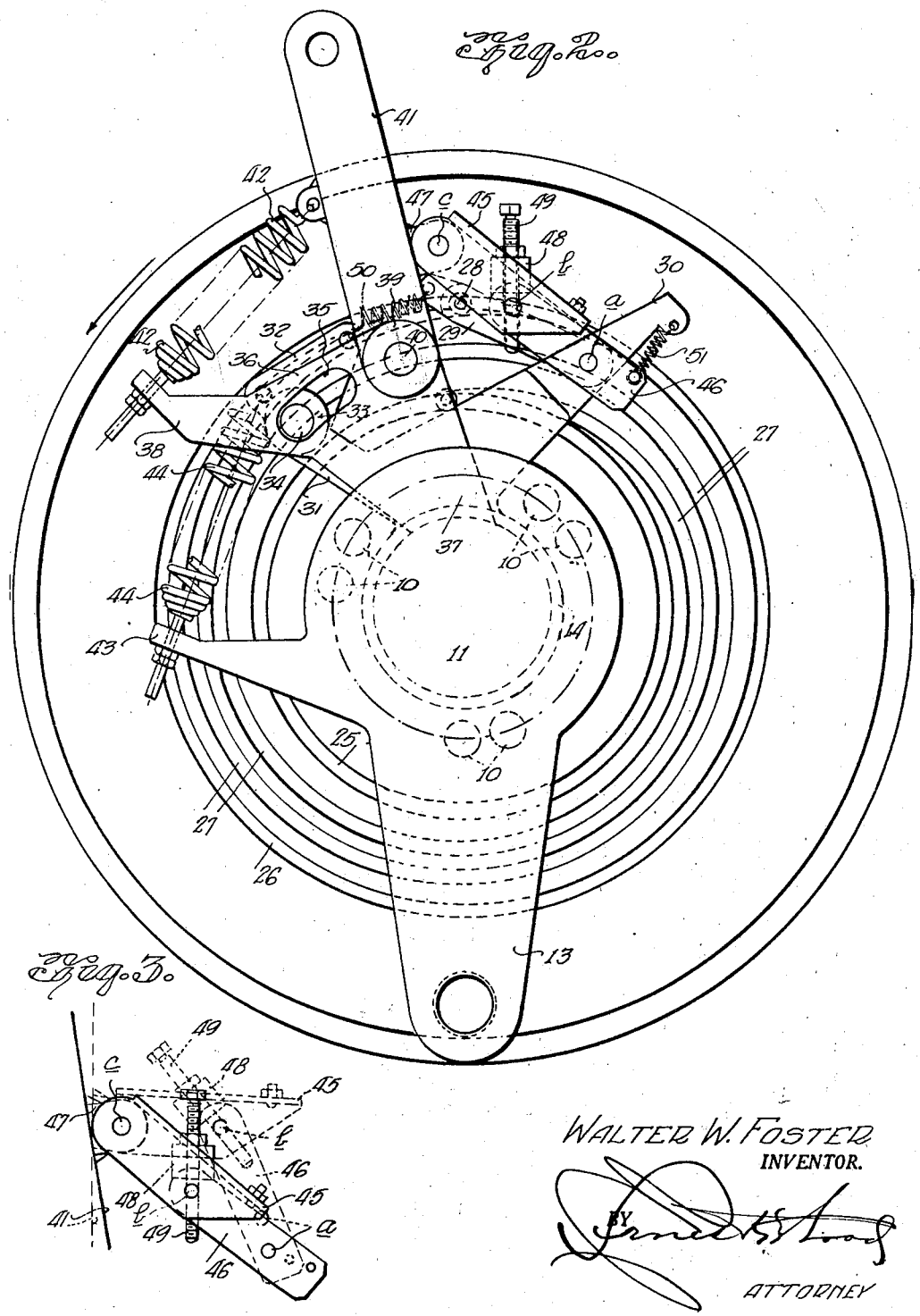

Patented Feb. 24, 1948

2,436,717

UNITED STATES PATENT OFFICE 2,436,717

AUTOMATIC CATHEAD

Walter W. Foster, Wichita Falls, Tex.

Application March 17, 1944, Serial No. 526,895

7 Claims. (Cl. 254—173)

This invention relates to well drilling equipment and it has particular reference to friction break-out catheads.

The principal object of the invention is to provide an apparatus for making up and breaking out casing having a clutch element fixed for common rotation with a line shaft and a complementary clutch element mounted for rotative and sliding movement upon a sleeve formed integrally upon a bracket stationarily mounted upon a support, and intermediate mechanism for moving the complementary clutch element into engagement with the rotating element and for effecting its retraction with the assurance that it will not crawl by reason of any influence thereon of the rotating element when disengaged. Chief among the provisions of the present invention however, is a cooperating link and lever assembly, combined with a pin and spiral guide, by virtue of which the number of revolutions of the complementary clutch element, which controls the movements of a service line drum, may be predetermined.

Break-out catheads of conventional manufacture are designed with a view of facilitating the work and minimizing hazards attending the making up and breaking out of well casing. Once set up to produce a stroke of definite length on a pull line or tool, no provision is made in these catheads to adjust the stroke. It is therefore the principal object of the present invention to provide such adjustment which will improve the performance of the cathead and materially increase the measure of safety it affords.

With the foregoing objects as paramount, the invention has further reference to certain features of accomplishment which will become apparent as the description proceeds, taken in connection with the accompanying drawings wherein:

Figure 1 is a side elevational view of a friction break-out cathead, constructed according to the present invention, in vertical section.

Figure 2 is a front elevational view of the stationary supporting bracket, lever and link assembly and spiral pin guide for controlling the operation of the sliding element of the clutch.

Figure 3 is a detail view of the link assembly in displaced relationship.

Figure 4 is a fragmentary perspective view of the control means for the link assembly.

In continuing with a more detailed description of the drawing, reference is primarily made to U. S. Letters Patents Nos. 2,062,705; 2,116,497 and 2,328,133. An examination of these patents will facilitate an understanding of certain structural characteristics of the cathead herein described with which the claimed improvements coordinate. These characteristics consist of a plurality of longitudinally adjustable pins 10, disposed at a variety of relative angles about the shaft 11 and whose spherically shaped ends 12 are retained in conformably shaped sockets provided in a stationary support 13 and in a slidingly and rotatably mounted ring 14. It will become apparent presently how the elements of the present invention will cause the pins 10 to be moved simultaneously to a position approaching parallel with each other and the shaft 11 to exert a thrust on the ring 14 to propel the drum 15 to the left in Figure 1 to effect frictional engagement of the braking surface 16 with that of a flange coupling 17, through which the shaft 11 is secured to an end of a draw works line shaft, not shown. Conversely, opposite rotation of the ring 14 will return the pins to their relative angular positions, retracting the drum 15 to disengage the flanges 16 and 17. The fact that the drum 15 is full floating on a sleeve 18, which is an integral part of the stationary supporting bracket 13, prevents any tendency on the part of the drum to "crawl" by reason of its being completely out of the rotative influence of the shaft 11 which constantly rotates, since it is joined by the flange coupling 17 to a similar coupling on the continuously rotating line shaft, not shown.

The mounting shaft 11 further carries a conventional line spool 19, secured against rotation thereon by keys 20. It is also to be observed that a replaceable bushing 21 is disposed intermediate the stationary sleeve 18 and the drum 15 and further, that the thrust imposed by the ring 14 on the drum 15 is borne by frictionless bearings 22.

The present invention consists primarily of a disc 23, conformably disposed on the face of the outer drum flange 24. This disc has in its exposed face inner and outer annular grooves 25 and 26 respectively which are interconnected by means of a spiral groove 27 (Fig. 2). Sliding in the grooves is a pin 28 carried by an end of a link 29, the opposite end of this link being pivoted at a to an arm 30 which is formed integral with the ring 14.

The arm 30 is a part of a peculiarly shaped element consisting of the arm 30 and a projection 31 having a head 32 and a boss 33 thereon carrying a pin 34 which latter enters a slot 35 in an immovable member 36. The member 36 is made up of the web 37 which is integral with the bracket 13 and sleeve 18; the radially extending arm 38 and the boss 39, to which is pivoted at 40 the operating lever 41. A spring 42 connects the operating lever 41 with the arm 38 and resists movement of the arm, returning it to inoperative position when actuated.

Integral also with the supporting bracket 13 is an arm 43. A spring 44 connects this arm and the movable member just described, holding the latter yieldingly in inoperative position.

Connected to and extending between the operating lever 41 and the arm 30 of the movable member is a sectional link, made up of a channel member 45 and a flat member 46, the latter being pivoted at $a$, which is also the pivotal point of the link 29, to the arm 30 and at its opposite end, it is pivoted at $b$ to the channel member 45 intermediate the ends of the latter. The channel member 45, in turn, is pivoted at $c$ to an ear 47, welded to one edge of the operating lever 41, as shown in Figure 2.

Welded or otherwise suitably secured to the far side of the channel member 45 is a lug 48, tapped and threaded to receive an adjusting screw 49 which latter predetermines the number of revolutions of the drum 15 in each operation, as will become apparent presently.

In operation, the line shaft, not shown, and consequently the mounting shaft 11 bolted thereto by means of the flange 17 and a companion element, is constantly rotating. This is true also of the service cathead or spool 19 which is keyed to the shaft 11. When the ring 14 is so positioned that the "crowder" pins 10 are disposed at a variety of relative angles, the main cathead or drum 15 is idle, the friction surfaces of members 16 and 17 being out of engagement.

In order to propel the member 16 towards and into engagement with the friction member 17, a pull is exerted upon a line (not shown) secured in the aperture in the end of the operating lever 41. This action causes the ring 14 to rotate and in so doing, the "crowder" pins 10 are moved simultaneously to a relatively parallel position or nearly so by virtue of their being anchored at one end to the stationary part of the mounting and at the other end in the ring 14. A thrust is thereby imposed upon the ring 14 which is conveyed to the drum 15 through the bearings 22 to effect the clutching action between members 16 and 17.

The spirally grooved disc 23, being affixed to the flange 24 of the drum 15, rotates therewith and as the starting position of the link 29 is as shown in broken lines in Figure 2, the follower pin 28 carried thereby will be constrained by virtue of a spring 50, connecting the outer end of link 29 to the head 32 of movable member 31, to travel upwardly in the interconnecting spiral groove 27 as the disc revolves. However, before operating the clutch, the screw 49, carried by the link section 45 and which lies in the path of the link 29 as it moves upward, is adjusted to predetermine the number of revolutions of the drum 15 which, in turn, determines the length of the stroke of the service line, not shown.

It will be observed in Figures 2 and 3 that the intermediate pivot pin $b$ connecting link sections 45 and 46 is slightly out of line with pivots $a$ and $c$. Thus, when a thrust is imposed on the linkage by a pull exerted on the operating lever 41, it has a tendency to buckle down instead of up. However, owing to the overhanging end of link section 45, it is constrained to remain rigid until the link 29, in moving upward under the influence of the pin 28 in the spiral groove 27, engages the adjusting screw 49, whereupon the pivot $b$ is urged upwardly and instantly the links 45 and 46 assume the position shown in Figure 3 under the influence of spring 44 in returning the arm 30 to its original position, guided by the slot 35 in the stationary part 36, previously described.

When the operating lever 41 is released spring 42 returns it to its original position, resetting the links and the small spring 51 connecting the outer end of the link 46 with arm 30, again urges the intermediate pivot $b$ of the linkage slightly out of alignment with the companion pivots $a$ and $c$, thus making the linkage rigid for further operation as explained. Simultaneously with the foregoing operation of resetting the linkage, the "crowder" pins 10 resume their inoperative positions or positions in which they are at a series of relative angles and in moving to such position, the clutch elements are caused thereby to disengage.

Whatever conventional means is employed to operate counter to the pull on the service line or counter to that imposed by drum 15, returns the grooved disc to its original or inoperative position. When used to actuate tongs in breaking out casing, a heavy spring or weight is employed to return the tongs to the original position preparatory to further movement in the opposite direction by the cathead.

Manifestly, the construction as herein shown and described is capable of some modification and such modification as may be construed to fall within the scope and meaning of the appended claims is also considered to be within the spirit and intent of the invention.

What is claimed is:

1. A friction break-out cathead including a member normally rotating in one direction, a drum movable into and out of frictional engagement with said normally rotating member, an operating lever therefor, a disc carried by said drum having a spiral guide on one face thereof, a link having a follower thereon influenced by said guide to move radially with respect to said disc when the latter is revolving, means including a link assembly pivoted in off-centered relationship and operatively connected to said operating lever to effect movement of the drum into engagement with said rotating member, a stroke adjusting screw carried by said link assembly and engageable by said first link to displace said link assembly to effect disengagement of said rotating member and said drum.

2. A friction break-out cathead including a normally rotating member, a drum having a flange engageable frictionally with said rotating member, an operating lever, means responsive to movements of said lever to advance said drum flange into frictional engagement with said rotating member, spring means resisting the action of said movement responsive means, a normally rigid link assembly pivoted in off-centered relationship connecting said operating lever and said movement responsive means for common movement in one direction, a spirally grooved disc on one flange of said drum, a guide operating in said groove constrained upon rotation of said drum carrying member to travel radially on one face thereof and adjustable means carried by said link assembly and engageable by said guide to displace said link assembly to disengage said rotating member and drum.

3. A friction break-out cathead including a constantly rotating friction member and a drum having a spirally grooved flange, a stationary support, means intermediate said stationary support and drum for effecting engagement of the latter with said friction member, an operating lever for said intermediate means, an off-centered link assembly connecting said operating lever and intermediate means for common movement in one direction, means operating in the groove of said drum flange and constrained by rotation of said drum to move radially thereof to displace said link assembly, adjustable means in the path of said radially movable means operatively connected to said off-centered link assembly to predetermine the degree of movement thereof and means effective upon displacement of said link assembly to return said intermeditae means to inoperative position to disengage said friction member and drum.

4. An automatic cathead including a member normally rotating in one direction, a rotatable drum having a spirally grooved flange and carrying a service line, means for effecting alternate connection and disconnection of said member and drum, an operating lever for said latter means, an off-centered normally rigid link assembly operatively connected to said lever and said latter means, an arm pivoted to said assembly operatively engaged with said spiral groove and constrained by rotation of said drum to move radially with respect to the axis thereof and adjustable means disposed in the path of said arm and engageable thereby to effect displacement of said link assembly and consequent disengagement of said rotating member and drum.

5. Apparatus of the character described including a constantly rotating member and a drum, crowder mechanism for moving said drum into and out of frictional engagement with said rotating member, an operating lever therefor, a normally rigid link assembly connecting said operating lever and crowder mechanism for operation against spring tension, an arm pivoted to said link assembly, means on said drum to cause one end of said arm to travel radially with respect to the axis of said drum to engage said link assembly to displace the same to effect release of said crowder mechanism to the action of said spring tension, and an adjusting screw carried by said link assembly to predetermine the degree of radial movement of said arm.

6. A line reciprocating apparatus including in combination with a constantly revolving shaft, a drum arranged for intermittent clutching engagement with said shaft and carrying a line, means for positively moving said drum into and out of said clutching engagement, an operating lever therefor, a pair of pivoted links connecting said lever and said drum moving means under spring tension, an arm pivoted at one end to said link assembly, means for causing the opposite end of said arm to travel radially with respect to the axis of said drum during operating periods of said drum and adapted to displace said links to actuate said drum moving means for disengaging said drum from said shaft and adjustable means carried by one of said links and disposed in the path of said arm for predetermining the degree of movement thereof to predetermine the length of stroke of said line.

7. A line reciprocating drum carrying a line, means for effecting engagement and disengagement of said drum with a constantly rotating shaft, an operating lever therefor, a pair of relatively pivoted links connecting said operating lever and said drum engaging and disengaging means and held under spring tension, a pivoted arm movable radially in response to rotative movements of said drum for actuating said links to effect disengagement of said drum and shaft and adjustable means mounted on one of said links and lying in the path of said arm for controlling the movement of said arm to predetermine the operating periods of said drum and consequently the length of stroke of the line carried thereby.

WALTER W. FOSTER.

REFERENCES CITED

The following references are of record in the file of this patent:

UNITED STATES PATENTS

| Number | Name | Date |
| --- | --- | --- |
| 2,163,028 | Foster | June 20, 1939 |
| 2,295,932 | Campbell et al. | Sept. 15, 1942 |
| 2,347,569 | Laraque | Apr. 25, 1944 |